(12) United States Patent
Nguyen et al.

(10) Patent No.: US 7,984,219 B2
(45) Date of Patent: Jul. 19, 2011

(54) ENHANCED CPU RASUM FEATURE IN ISS SERVERS

(75) Inventors: Vincent Nguyen, Houston, TX (US); Kevin Depew, Kingwood, TX (US); John D. Nguyen, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 971 days.

(21) Appl. No.: 11/199,523

(22) Filed: Aug. 8, 2005

(65) Prior Publication Data

US 2007/0033315 A1  Feb. 8, 2007

(51) Int. Cl.
*G06F 13/00* (2006.01)

(52) U.S. Cl. ......................................... 710/300; 713/100

(58) Field of Classification Search .......... 710/300–304, 710/10; 713/100
See application file for complete search history.

(56) References Cited

U.S. PATENT DOCUMENTS

| 6,282,596 B1 * | 8/2001 | Bealkowski et al. ......... 710/302 |
| 6,917,999 B2 * | 7/2005 | Kumar et al. ................. 710/302 |
| 7,107,405 B2 * | 9/2006 | Lovelace ...................... 711/133 |

* cited by examiner

*Primary Examiner* — Clifford H Knoll (57) ABSTRACT

Generally, in accordance with embodiments of the present invention, a system having a north bridge and two or more Front Side Buses (FSBs) coupled to the north bridge is provided. The first front side bus has at least a first central processing unit coupled thereto. The second front side bus has at least a second central processing unit coupled thereto.

19 Claims, 4 Drawing Sheets

ENHANCED CPU RASUM FEATURE IN ISS SERVERS

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

With today's high speed technology and ever-increasing demand on system performance, system downtime has a greater impact on business and technology than ever before. For systems having multiple central processing units (CPUs) coupled to each other and to various shared system components through a north bridge, a single CPU failure may negatively impact that entire system. In many cases, a CPU failure may result in a failure of the entire system. Even if the CPU failure does not cause a total system failure, the identification of the CPU failure, the repair of the CPU and/or the replacement of the CPU may require that the system be taken off line for a period of time. As previously described, this system downtime may negatively impact users. Further, in instances where CPUs are added or removed from a system, it is advantageous to provide features that are robust enough to allow for addition and removal of CPUs with minimal interruption of system functions. Minimizing system interruptions will enhance system performance and user satisfaction.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business related constraints which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, in accordance with embodiments of the present invention, a system having two or more Front Side Buses (FSBs) is provided. By implementing a dual or multi FSB architecture, one or more central processing units (CPUs) or entire FSBs may be replaced with minimal interruptions to the system and users of the system. The dual/multi FSB architecture provides electrical isolation of CPUs which may be engaged to allow hot-add and hot-removal of a CPU or FSB, as will be described further below. The present embodiments also provide the ability to boot-up a system with a defective FSB disabled or mapped out, rather than exhibiting a no-boot condition or other system error, as is typical in standard systems. With the component level diagnostic capability that may be initiated through an active FSB, a user or field service representative can effectively pinpoint problems associated with CPUs on a FSB exhibiting an error and quickly bring the server back on line. Furthermore, with a hot-remove supported operating system (OS), system availability is enhanced and only scheduled down time is needed for service. Hot-Add processor support increases server availability by eliminating downtime required to upgrade a system's processor configuration. Hot-Add support will work in conjunction with a hot-remove supported OS in providing Hot-Swap ability to eliminate downtime due to a degraded CPU or FSB.

Figure 1:
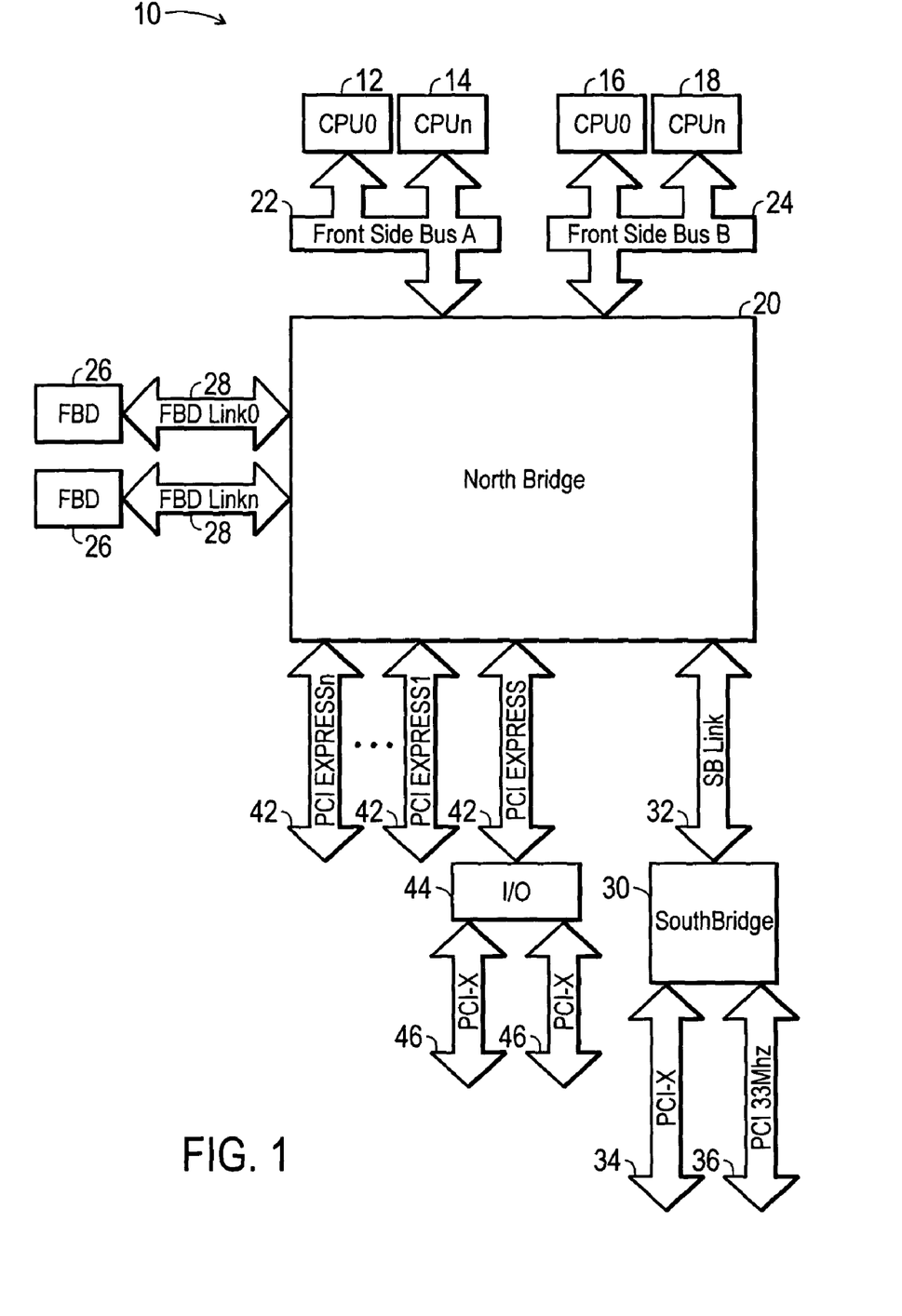
FIG. 1 is a block diagram of an exemplary system having a dual front side bus architecture in accordance with embodiments of the present invention.

Referring to FIG. 1, a block diagram of an exemplary system 10 having a dual front side bus architecture in accordance with embodiments of the present invention is illustrated. Specifically, the system 10 includes a plurality of central processing units (CPUs) 12, 14, 16 and 18. The CPUs 12-18 may be hot-pluggable, as described further below. In accordance with the present exemplary embodiment, the CPUs 12 and 14 are coupled to a north bridge 20 through a first front side bus (FSB) 22. The CPUs 16 and 18 are coupled to the north bridge 20 through a second front side bus (FSB) 24. As will be appreciated, additional front side buses 22 and 24 and CPUs 12-18 may be provided (multi FSB architecture). As long as two or more FSBs 22 and 24 are provided with at least one CPU 12-18 coupled to each, benefits of the present design may be realized, due to the electrical isolation of the CPUs and the implementation of the present techniques. As discussed above and described in greater detail below, by providing a dual/multi FSB architecture, the system 10 may be configured to boot with a defective FSB 22 or 24 disabled or mapped out. With the component level diagnostic capability via the active FSB 22 or 24, a user or field service representative can effectively pinpoint a problem and quickly bring the system 10 on line.

Furthermore, the system 10 may be advantageously configured to support hot-plug, hot-add, hot-swap and hot-remove CPUs 12-18. As used herein, "hot-plug" generally refers to the ability to insert/add, remove or swap a system component, such as a CPU 12-18, without powering the system down or otherwise bringing the system offline. These operations are performed while the operating system continues to run normally. Specifically, "hot-add" refers to the ability to insert a system component, such as a CPU 12-18, without powering the system down or power cycling the system to bring the newly plugged component on-line. "Hot-remove" refers to the ability to remove a system component, such as a CPU 12-18, without powering the system down. "Hot-swap" refers to the ability to remove and replace a system component, such as a CPU 12-18, without powering the system down. With a hot remove supported operating system (OS), the availability of the system 10 is enhanced by allowing degraded CPUs to be removed without interruption to the system. Hot-Add processor support increases the availability of the system 10 by eliminating downtime required to upgrade a system's processor configuration. Hot-Add support will work in conjunction with a hot-remove supported OS in providing Hot-Swap ability to eliminate downtime due to a failed processor.

The north bridge 20 provides data ports and buffering for data transferred between the CPUs 12-18, system memory, and various other system components. The system memory may include a number of fully buffered dual inline memory modules (FBD) 26. Each FBD 26 is coupled to the north bridge 20 through a memory bus, such as an FBD link 28. The north bridge 20 is coupled to a south bridge 30 via a south bridge link bus 32. The south bridge link bus 32 may be a peripheral component interconnect (PCI) bus or numerous other proprietary busses, for instance. As will be appreciated, the south bridge 30 is an integrated multi-functional component that may provide functionality and/or connection to certain components to support an enhanced direct memory access (DMA) controller, interrupt controller, integrated drive electronics (IDE) controller, universal serial bus (USB) controller, a system read only memory (ROM) interface, and power management logic, among other things. The south bridge 30 may provide access to various PCI and PCI express (PCI-X) components (not shown) through a PCI bus 34 and PCI-X bus 36. The north bridge 20 may also include a number of other links or buses, such as PCI or PCI-X buses 42 for coupling additional PCI and PCI-X components directly to the north bridge 20. For instance, an I/O bridge 44 may be coupled directly to the north bridge 20 through a PCI-X bus 42. The I/O bridge 44 may provide access to various I/O components (not shown) through buses 46, which may be PCI-X buses, for instance.

As will be appreciated by those skilled in the art, the system 10 is provided by way of example. The system 10 may include any one of a number of alternate system configurations which may employ the dual/multi front side bus (FSB) architecture. Each FSB (e.g., 22 and 24) is coupled to the north bridge 20 and one or more CPUs. As will be described further with reference to FIGS. 2-4, the dual/multi FSB architecture provides a mechanism for implementing hot-add, hot-remove and CPU/FSB map-out functions in accordance with embodiments of the present invention.

Figure 2:
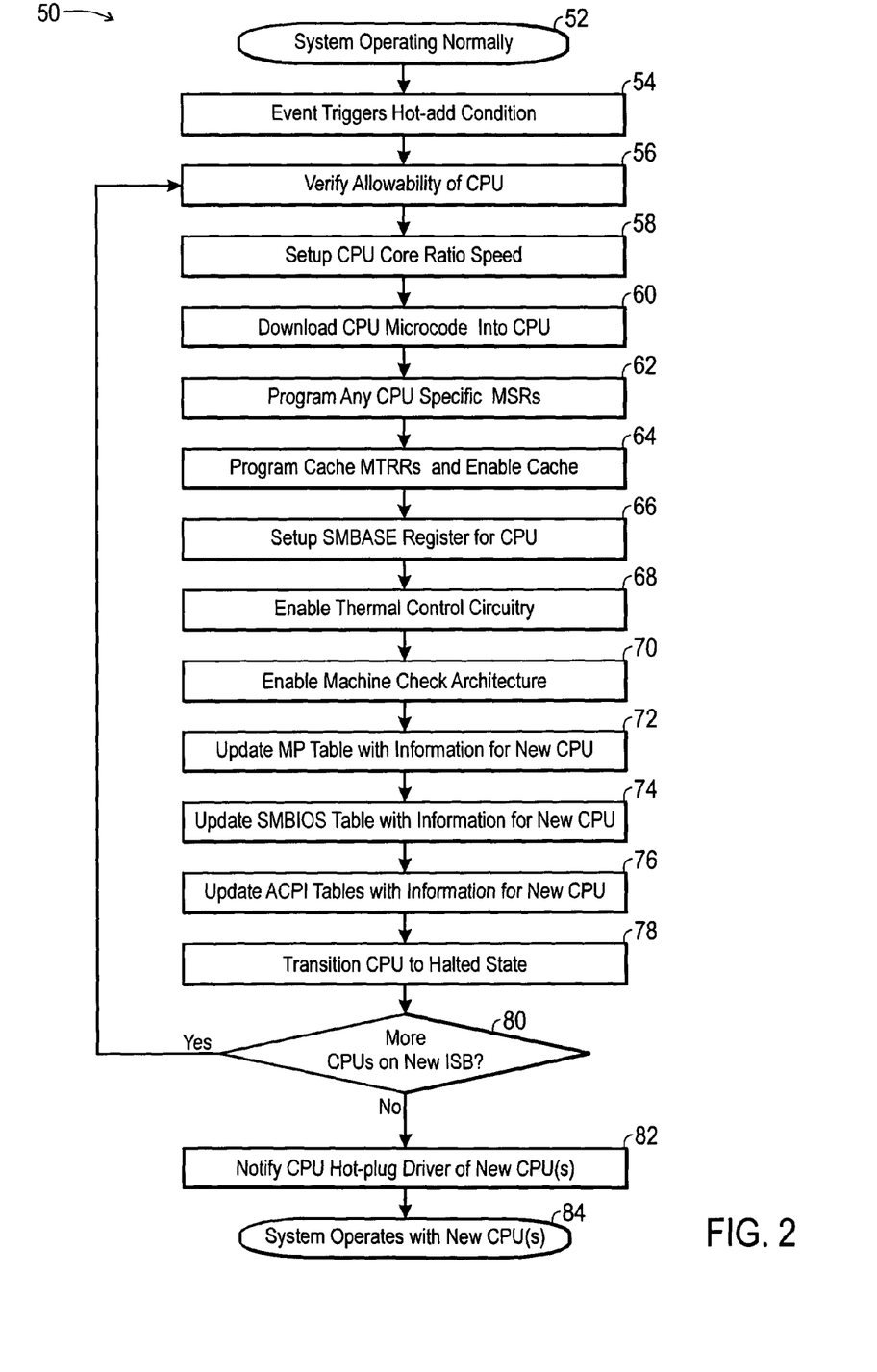
FIG. 2 is a flow chart indicating exemplary steps for hot-adding a central processing unit or front side bus to a system in accordance with embodiments of the present invention.

FIG. 2 is a flow chart indicating exemplary steps for hot-adding a central processing unit or front side bus to a system in accordance with embodiments of the present invention. The CPU hot-add architecture is designed with the powered-down FSB concept for all empty buses, and FSB traffic on active buses is completely isolated from powered-down buses. That is to say, when an FSB is powered down, there are no transactions being forward onto the powered-down bus. As a result, the FSB performance is optimized because the effective system latency is reduced due to the reduction of snooping traffic normally occurring on all FSBs, as will be appreciated by those skilled in the art. Accordingly, only those CPUs on the powered-up FSBs are active. Electrical isolation can be done by external discrete components or via chipsets or processors. In a multi FSB architecture, each FSB segment is independently isolated via a chipset. In a link based architecture which has point-to-point interconnect among CPUs and I/O hubs, each link within a component is electrically isolated from the others.

Upon detection of a CPU installation on a powered-down FSB or via a graphical user interface (GUI), a powered-down FSB can be instructed to power-up (via a CPU hot plug controller, for instance) with a sequence that conforms to system specifications. The CPU hot plug controller maintains and activates the new bus segment and informs firmware to program and configure the north bridge 20. After the CPU is reset, the hot-added CPU can locally run self-diagnostic tests and BSP deterministic transactions, while the corresponding FSB is still hidden from system resources. In accordance with typical systems, upon reset the CPU will begin executing code at location 0FFFFFFF0h. This will address into the system ROM code. In one exemplary embodiment, the code will be addressed into the bootblock portion of the system ROM. In this exemplary embodiment, this code will immediately jump into the 0F000h segment. In this implementation, this code will jump into the shadowed copy of the system ROM. For reference, this will be the same situation as types of warmboots, such as when a processor receives an INIT command. During a true power-on event, as opposed to an added CPU event, the code will jump into the boot-block code in the 0F000h segment. Thus, the code will be redirected in the case of a processor hotplug event and take a different code path. In a normal warmboot condition, the POST code will generate a hard reset to the system to essentially turn the warmboot into a full cold boot. The system would then initializes all ASICs, memory, processors, etc. However, in the hot-plug condition, the firmware will detect that this is a not a warmboot, and will take a codepath specific to the hot-plug CPU event.

In accordance with embodiments of the present techniques, in a processor hotplug situation, the code will only be responsible for initializing the new CPU and FSB, initializing various tables to indicate the existence of the new CPU, and notifying the OS of inserted processor. Advantageously, all other aspects of the system are already be initialized. As will be appreciated, the code located at 0FFFFFFF0h can determine whether this is not the first time that POST is being initiated and thus, that this is a hotplug event, through a number of methods. For instance, the code may determine whether the memory controller is already enabled. If it is already enabled, this indicates that this is not a normal power-on condition. There are numerous other chipset registers which can be checked to determine whether it is a normal power on or a hot-add processor condition. A BIOS RAM variable could also be used to detect the condition. As can be appreciated by one skilled in the art, there are numerous methods that can be used to detect that a specific codepath should be executed on the hot-plug event.

Once the code determines this is a processor hot-add condition, the code will branch off into a separate code path. In accordance with an exemplary embodiment of the present invention, the hot-add processor code performs a number of functions to enable the hot-adding of one or more CPUs. This special hot-add processor code will be responsible for the following tasks, which are described in more detail below with reference to FIG. 2: 1) verify that the additional of the CPU is allowable; 2) setup processor core ratio speed; 3) download processor microcode into the CPU; 4) program any CPU model specific registers (MSRs); 5) program cache memory type range registers (MTRRs) and enable cache; 6) setup system management base (SMBASE) register for processor; 7) enable the thermal control circuitry; 8) enable machine check architecture; 9) update system management basic input output system (SMBIOS) table with information for new CPU; 10) Update advanced component and peripheral interconnect (ACPI) tables with information for new CPU; 11) place new CPU in a halted state; 13) Repeat the procedures for other CPUs on same new added FSB; and 14) notify the CPU hot-plug processor driver of the new CPU(s). As will be appreciated, these techniques would be implemented by code running on the newly inserted CPU.

Referring now to the flow chart 50 of FIG. 2, initially, the system 10 is operating normally, as indicated in block 52.

That is to say that at least one FSB having at least one CPU attached thereto is fully functional. When a user desires to add a CPU to the system, via an isolated FSB, an event triggers the initiation of the hot plug process, as indicated in block 54. The event may be inserting a new CPU into an open port on the powered-down FSB, for instance. Also, the user could be required to move some physical switch as part of seating the CPU which could initiate the hot-plug process. The hot-plug process could be initiated by the generation of an SMI which is triggered by the aforementioned event or the CPU could automatically be reset when this event occurs. If the event triggers an SMI, the SMI handler would generate a reset to the CPU resulting in the initiation of the hot-plug CPU state machine. Next, the code verifies that the CPU can be implemented in the system, as indicated in block 56. There are a number of reasons that the CPU may not be allowed in the current system. The CPU verification may involve performing a CPUID instruction to determine that the CPU is supported by the current platform. The code will also determine whether the CPU is supported by determining whether the basic input output system (BIOS) contains a microcode for the newly installed CPU. Current operating systems (OSs) generally require that the lowest stepping processor be the bootstrap processor (BSP), because the OS only looks at the BSP when determining what features and instruction sets are supported by the CPU(s). If the newly installed CPU is a lower stepping than all installed CPUs, then the installation of the CPU will not be allowed. In addition, if the newly installed CPU's maximum speed is slower than the current operating frequency, the CPU hot-add will not be allowed. If the processor installation is not allowed, the code may be configured to provide an installation failure notice to the user to indicate installation failure, such as illuminating an LED and notify the OS via an original equipment manufacturer (OEM) supplied driver which can communicate with the hot-add BIOS code.

After verifying the allowability of the new CPU the CPU's ratio configuration register is programmed to setup the CPU core ratio speed, as indicated in block 58. The CPU will generally default to its highest supported speed. However, the system ROM will program the speed of all CPUs in the system to the lowest speed processor in the system during POST. The newly installed CPU is setup to run at the same frequency as all currently installed CPUs. Alternatively, the system may be configured such that any hot-added processor must be the same speed as the currently installed lowest speed CPU. After programming the Ratio Configuration Register, the CPU is reset to allow it to accept the new frequency. As will be appreciated, the chipset may be configured to support a processor specific reset. Alternatively, external glue logic may be employed to provide such feature. During this process, other CPUs in the system should not be reset. Resetting other processors will cause the code to be redirected back to the reset vector (0FFFFFFF0h). The present code will provide directing the code to jump directly back into the CPU hot-add code path where it left off.

Next, a CPUID instruction is executed to determine the model and stepping of the new CPU, as indicated in block 60. The CPUID instruction points the extended account register (EAX) to the physical address of the correct microcode update stored in the physical ROM, and then programs the microcode update trigger register to cause the CPU to accept the microcode. Next, any MSRs are programmed to set them for the particular system architecture, as indicated in block 62. For instance, the platform may choose to enable or disable certain performance settings within the CPU. In addition, MTRRs are modified to enable/disable numerous processor specific features. In general, the hot-add code programs these values to what they would have been programmed to had the hot-plug CPU been installed prior to powering on the system. As will be appreciated, the MSRs are employed to provide specific features, such as those associated with ECC, status and cache initialization, for instance.

Next, all of the hot-plug CPUs fixed and variable MTRR registers are set to match the memory map of the system, as indicated in block 64. As will be appreciated, the MTRRs are employed to operate in conjunction with the CPU cache. These values are programmed to exactly the same values as those associated with the other CPUs in the system. During the hot-add process, the code will not have access to the MTRRs of the other processors. Accordingly, to retrieve these values, the power on self test (POST) may be employed to store the values somewhere in memory or non-volatile storage. Alternately, the same MTRR initialization algorithm can be run which was run during POST in which the memory map is determined and the MTRRs are dynamically setup. This should result in exactly the same programming as all other processors. Once the MTRRs are initialized, the cache of the new CPU is enabled via Control Register 0.

Next, the SMBASE register is setup for the CPU, as indicated in block 66. The SMBASE register is employed to direct the processor where to start execution when a System Management Interrupt (SMI) occurs. The SMBASE register setup may be difficult because all IA-32 processors default the SMBASE register to cause execution to begin at address 3000:0000 on an SMI. The method for changing the SMI base address during POST is to copy a temporary SMI handler to 3000:0000, generate an SMI, and have the temporary handler modify the SMBASE register. The processor's SMBASE can only be modified while in the SMI handler (when SMIACT# is active). During runtime (which is the condition of a hot-add event), causing an SMI on the new CPU would result in code being executed at 3000:0000. However, this would be somewhere in the middle of the operating system or some application and would thus result in undesirable behavior. As such, it is desirable for the system to begin executing a desired set of instructions when the first SMI is generated. The goal will be to change the SMI Base address to the 0A000h segment, where the normal SMI handler is stored at runtime. One method of accomplishing this is to provide the new CPU with a unique view of 3000:0000. With a point-to-point front side bus, in accordance with embodiments of the present invention, this is feasible. The newly installed CPU has no need to access the actual system memory located at 3000:0000. Thus, the CPU can decode 3000:0000h to memory different than the "true" system memory at 3000:0000h. If the CPU has its own unique view of 3000:0000h, the hot-add ROM code simply copies an basic SMI handler to 3000:0000 and generates an SMI on the newly installed CPU. The basic SMI handler code at 3000:0000 will modify the SMBASE register to address to the 0A000h segment. This can be accomplished through chipset support for allowing memory accesses to 3000:0000 to be redirected to a different memory area. This could be memory within the chipset or processor, or some of the physical RAM which is set aside for this purpose during POST. Once of the process of modifying the processor's SMI base register is complete, the processor's unique view of 3000:0000h will be disabled such that the CPU will now access the "true" memory at 3000:0000h.

Next, the code may program the miscellaneous MSRs to enable the thermal control/monitoring circuitry, as indicated in block 68. The code may also be configured to enable various error sources via the MSRs, as indicated in block 70. Additionally, the MP Table is updated with information pertaining to the new CPU, as indicated in block 72. However, an OS, which supports hot-add processors, would likely not use the MP table. Instead, the OS would make use of the ACPI tables. Thus, this step (block 72) may be omitted. Next, in Step 9 the SMBIOS tables are updated to indicate the existence and speed of the newly installed CPU, as indicated in block 74. This is not implemented for any functionality other than for software programs which report information about installed CPUs. Accordingly this step (block 74) may also be omitted without loss of important functionality. This step is not essential for the OS making use of the new CPU. Next, the ACPI tables are updated to include information regarding the new CPU, as indicated in block 76. As will be appreciated, the ACPI tables provide the mechanism by which the OS will be informed of the new CPU. The ACPI tables will be modified to indicate the existence of the new CPU. In addition, such information as power states supported by the processor will be updated in the ACPI tables. The ACPI tables allow the OS to be abstracted from hardware-specific knowledge.

Once the registers and tables are programmed and updated, a halt instruction is executed on the new CPU, as indicated in block 78. At this point, the new CPU will have been fully programmed up and will be ready for use by the OS. The new CPU is the same state in which an application processor is left coming out of POST. As discussed above, multiple CPUs may be added on a single front side bus. That is, the processor hot-add event could involve adding more than one processor if the FSB supports more than one processor. Accordingly, the steps indicated in blocks 56-78 may be repeated for any additional processors on the new FSB, as indicated in block 80.

Once the process is completed for all CPUs on the new FSB, Step 13 the OEM supplied hot-plug processor driver is notified of the existence of the new CPU(s), as indicated in block 82. This driver will notify the OS of the new CPU(s). The present embodiment will use the currently existing implementation for notifying the OS OEM driver of the existence of new events. This will involve generating an interrupt to the driver and allowing the driver to do a proprietary API call into the ROM to determine that a new CPU was installed. Since the newly installed CPU initiates the process of notifying the OS of its existence, it performs this step prior to running the halt instruction (block 78). This could involve generating an SMI for the other processors so that they can notify the OS driver. In other words, the step included in block 80 begins before the halt instruction (block 78) is complete.

In accordance with an alternate embodiment of the invention an OS OEM driver may not be employed. In such an embodiment, the OS could be notified directly of the new CPU by the System ROM generating an System Control Interrupt (SCI) to the operating system. This SCI interrupt would result in the OS running an ACPI Method that would notify the OS of the newly installed processor. In either implementation, the process is similar. The System ROM generates and interrupt to an OEM supplied driver in one implementation while generating an SCI interrupt to the OS in the other implementation. Both methods result in the OS being informed of the new processor via the updated ACPI Tables.

The hot-add process can be simplified by providing an EEPROM on the new CPU. This additional EEPROM could allow for programming the address of the location where the processor should begin execution on a hot-add event. This would prevent the code at 0FFFFFFF0h from having to determine whether the system is performing a processor hot-add or performing a warmboot. In this case, the process of hot adding a CPU would begin executing at code that would be unique for hot-add. The newly inserted processor would begin execution at code, which would assume it was only executed for a hot-add situation. Also, the EEPROM could provide the base address for SMIs to greatly simplify the setup of the SMBASE register (block 66). Rather than having the SMBASE register default to 3000:0000, it could be set to default to a location which would not conflict with the operating system or application memory. It could default to somewhere in the A000h segment, for instance. This would prevent having to have chipset support for providing the newly installed processor with a unique view of memory.

As will be appreciated, the various steps and address locations described above are provided by way of example. Certain features may be varied or omitted. The present hot-add concept is intended to provide for hot-adding a CPU into a system, by providing more than one front side buses to allow for electrical isolation of CPUs. Various system architectures may require modifications to the aforementioned process. The specific steps of the flow chart 50 provide an exemplary embodiment of an implementation of the disclosed concepts.

Figure 3:
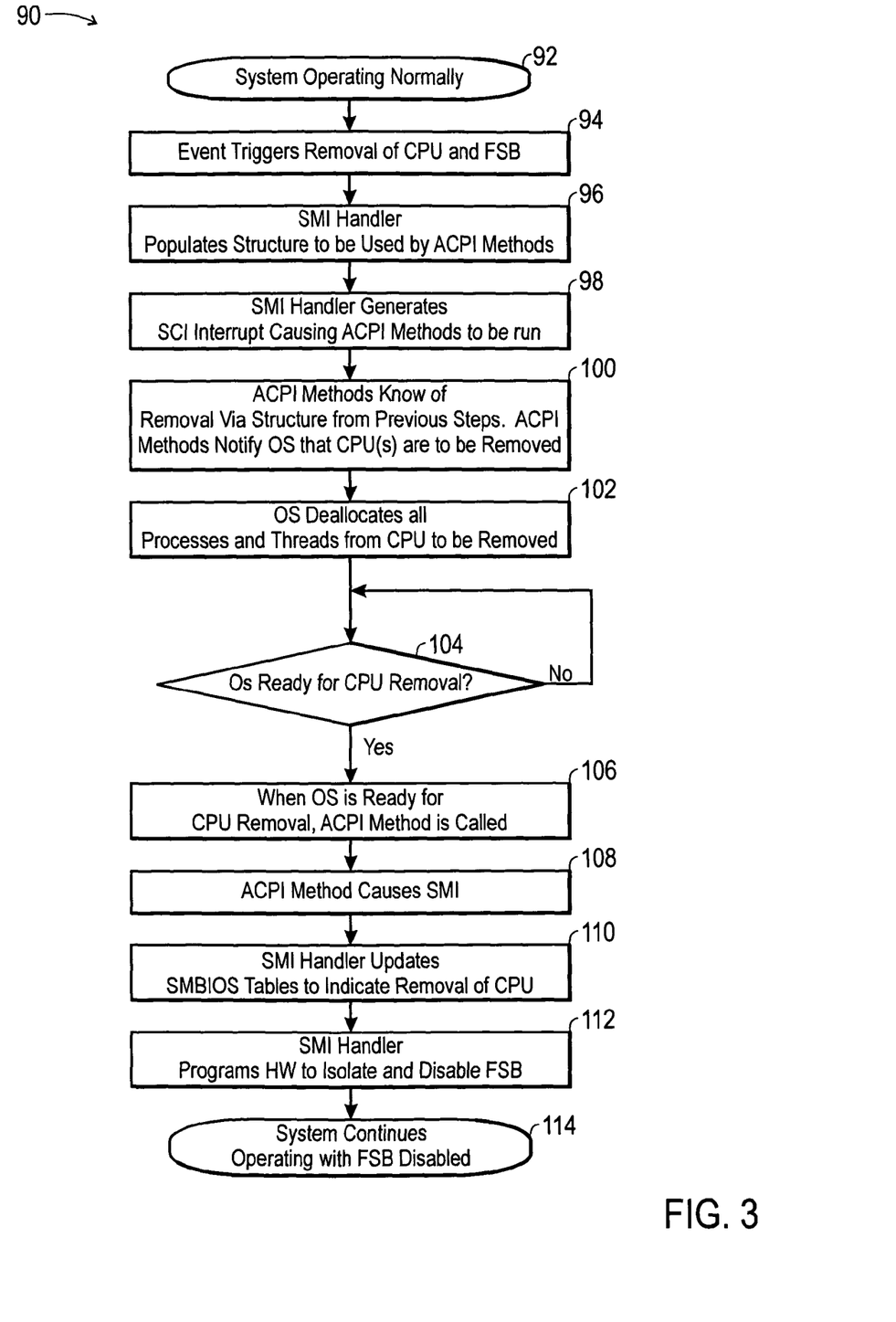
FIG. 3 is a flow chart indicating exemplary steps for hot-removing a central processing unit or front side bus to a system in accordance with embodiments of the present invention.

FIG. 3 is a flow chart 90 indicating exemplary steps for hot-removing a central processing unit or front side bus from a system in accordance with embodiments of the present invention. Initially, the system 10 operates normally, as indicated in block 92. Next, an event triggers the removal of a CPU or FSB from the system 10, as indicated in block 94. The triggering event may be caused by a user flipping a switch or a lever to indicate that the CPU or FSB will be removed. Alternatively, the triggering event may be caused by detection of a high rate of errors on a CPU or FSB. Regardless, once the triggering event occurs, an SMI initiates the removal process.

Next, an SMI handler populates the structure to be used by the ACPI methods, as indicated in block 96. The SMI handler generates an SCI interrupt causing the ACPI methods to be run, as indicated in block 98. Next, the ACPI methods notify the operating system that the CPU or FSB is to be removed, as indicated in block 100. Next, the operating system de-allocates all processes and threads from the CPU or FSB to be removed, in order to electrically isolate the FSB, as indicated in block 102. If the operating system is not ready for removal of the CPU or FSB, the operating system maintains a wait state, as indicated in block 104. Once the operating system is ready for CPU removal, the ACPI method is called, as indicated in block 106. Next, the ACPI method initiates an SMI, as indicated in block 108. The SMI handler updates the SMBIOS tables to indicate the removal of the CPU, as indicated in block 110. The SMI handler then programs the hardware to isolate and disable the FSB corresponding to the CPU, as indicated in block 112. Finally, the system 10 continues to operate with the FSB disabled, as indicated in block 114.

As will be appreciated, this process can be used to increase reliability and availability of the system. For a system capable of monitoring correctable processor errors, such as correctable errors in the processor's cache or correctable errors in the front side bus, this allows removing a degraded processor or front side bus from the system prior to a fatal error occurring. While the system will operate in a degraded condition due to a lack of the disabled CPU or front side bus, the removal of a degraded component can result in increased up-time of the system. In addition, for an operating system that supports hot-remove and hot-add CPU, a degraded processor can be hot-swapped without any down-time to the system.

Figure 4:
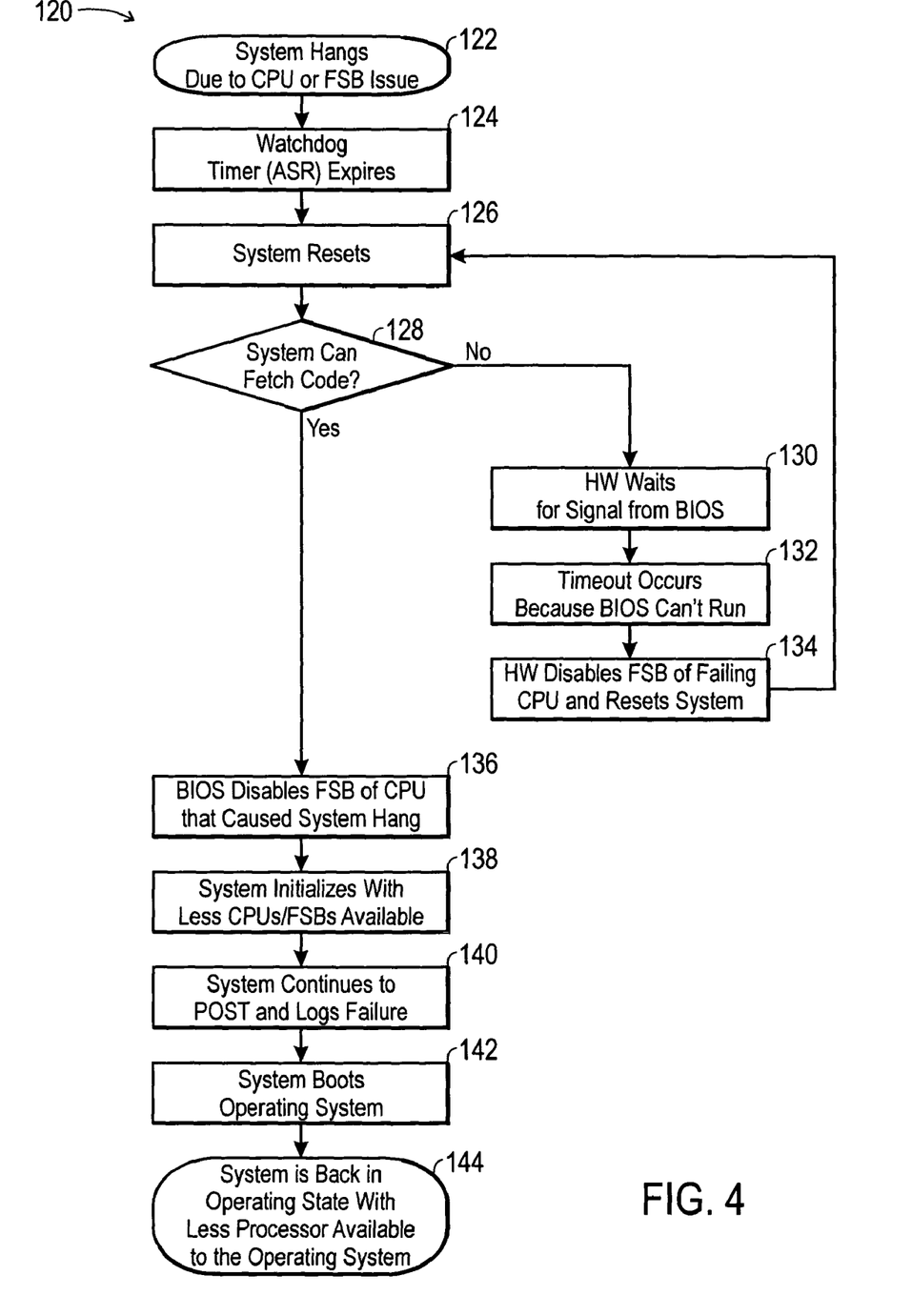
FIG. 4 is a flow chart indicating exemplary steps for mapping out a central processing unit or front side bus from a system exhibiting an error in accordance with embodiments of the present invention.

FIG. 4 is a flow chart 120 indicating exemplary steps for mapping out a central processing unit or front side bus from a system exhibiting an error in accordance with embodiments of the present invention. The presently described method works with current operating systems. The features of the present system support a watchdog timer/counter that an operating system driver periodically updates. If the counter ever expires because the driver did not update it, the hardware will automatically reset the system. The driver would not be able to update the counter if the system hung. With today's systems, if the system hung due to a FSB or CPU error, the system would reset, but would likely hang again, possibly during POST or once the OS is booted, because of the same FSB or CPU errors. The present flow chart 120 provides a way of electrically isolating the failing CPU or FSB from the system after the reset. In accordance with one exemplary embodiment, this is done by the BIOS if the system fetches code on the reset, or by the hardware if the system does not fetch code. The hardware would disable the FSB after a timeout waiting for the BIOS (after the reset) to disable the timer.

Referring now to FIG. 4, during run time, a CPU or FSB may fail or exhibit a large number of errors, as indicated in block 122. After the watchdog timer expires, as in block 124, the system 10 resets, as indicated in block 126. Next, it is determined whether the system 10 can fetch code, as indicated in block 128. If the system 10 cannot fetch code, the hardware waits for a signal from the BIOS, as indicated in block 130. If a failure is present, a timeout occurs because the BIOS cannot run, as indicated in block 132. Finally, the hardware disables the front side bus of the failing CPU and resets the system, as indicated in block 134.

If the system can fetch code, the BIOS disables the FSB of the failing CPU, as indicated in block 136. The system then initializes with less CPUs and FSBs available, as indicated in block 138. In other words, upon initialization, the failing CPU and the FSB coupled to that CPU are mapped out of the system. Next, the system continues to POST and logs the failure, as indicated in block 140. Finally, the system boots the operating system, as indicated in block 142. Ultimately, the system 10 is brought back into an operational state with the CPUs and the FSB having the failed CPU unavailable or mapped out of the operating system, as indicated in block 144.

Advantageously, the presently described concepts adapt well with other Reliability, Availability, Serviceability, Usability and Manageability (RASUM) features, such as Hot add/remove memory, Hot-plug PCI, Hot-plug drive, and other devices (USB, Mouse, KB). With the implementation of embodiments of the present techniques, a system continues to operate in an OS supported hot add/remove environment or to reboot and to come back up with a defective FSB disabled in a non-support hot add/remove environment. In the OS supported hot remove environment, a defective FSB is mapped and powered down. The failed FSB components (e.g., CPU) can be logged by a CPU on an active bus via system management mode or health driver. Under an OS which does not support hot add/remove of processors, the system performs a hot spare boot (HSB) event when a defective FSB is detected and upon the next power-up sequence. The hot-spare boot programmable array logic (PAL) would detect that no processor is executing code because the system ROM would not have hit a special register indicating that it has fetched code. If this register is hit within a specified amount of time, the hot-spare boot PAL will assert a signal to the chipset indicating to disable a FSB and will reset the system. If the FSB had a problem which was corrupting all processor buses (not just affecting the processors on the bad FSB), then disabling the bad FSB would allow the system to begin fetching code by a processor on the remaining functional FSB. A CPU on an active FSB can perform diagnostic tests and report the health status of a failure component on the defective FSB. With the component level diagnostic capability, a user or field service representative can effectively pinpoint the problem and quickly bring the system back on line. As the result, system uptime is increased and the associated cost with downtime is effectively eliminated.

The present techniques provide another level of field diagnostic to identify bad components (e.g., CPUs) rather than going through a process of elimination to determine the source of the no-boot condition. As will be appreciated, this process can be time consuming and may cause customer dissatisfaction. Advantageously, the present techniques reduce the number of cannot duplicate printed circuit assemblies (CND PCAs) returned from the field. Embodiments of the present invention also prevent system downtime due to failed processors or due to the need to upgrade a system's processor configuration.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system comprising:
   a north bridge;
   a first front side bus coupled to the north bridge via a first path;
   a second front side bus coupled to the north bridge via a second path, wherein the second path is entirely distinct from the first path;
   a first central processing unit coupled to the north bridge through the first front side bus; and
   a second central processing unit coupled to the north bridge through the second front side bus.

2. The system, as set forth in claim 1, comprising a third front side bus coupled to the north bridge and a third central processing unit coupled to the north bridge through the third front side bus.

3. The system, as set forth in claim 1, comprising a third central processing unit coupled to the north bridge through one of the first front side bus and the second front side bus.

4. The system, as set forth in claim 1, wherein the north bridge is configured to electrically isolate the first central processing unit on the first front side bus from the second central processing unit on the second front side bus when one of the central processing units is powered-down.

5. The system, as set forth in claim 1, wherein the north bridge is configured to electrically isolate the first front side bus from the second front side bus in response to a hot-add event.

6. The system, as set forth in claim 1, wherein the north bridge is configured to disable the first front side bus or the second front side bus in response to a removal event.

7. The system, as set forth in claim 1, wherein the north bridge is configured to map out or disable, or map out and disable the first front side bus or the second front side bus if an error is detected on the corresponding front side bus or a central processing unit on that front side bus.

8. A method of hot-adding a central processing unit to a computer system, wherein the computer system comprises a first front side bus and a second front side bus each coupled to a north bridge of the computer, comprising:
   coupling a central processing unit to the second front side bus, wherein the second front side bus is in a non-operational state, wherein the first front side bus comprises an entirely distinct path to the north bridge from the second front side bus;

powering the second front side bus;

initializing the central processing unit;

updating tables and registers in the computer system to include information correlative to the central processing unit;

notifying an operating system of the computer system that the central processing unit has been coupled to the computer system; and operating the central processing unit in the computer system.

9. The method, as set forth in claim 8, comprising triggering a hot-add condition.

10. The method, as set forth in claim 8, comprising verifying allowability of the central processing unit in the computer system, before initializing the central processing unit.

11. The method, as set forth in claim 8, wherein initializing the central processing unit comprises:

setting a processing speed for the central processing unit;

programming mode state registers on the central processing unit;

programming memory type range registers on the central processing unit;

enabling cache memory on the central processing unit; and setting up an SMBASE register on the central processing unit.

12. The methods, as set forth in claim 11, wherein the SMBASE register is updated when hot-adding a processor by providing the CPU with a unique decode of memory addresses or by utilization of a separate EEPROM which includes a default SMBASE address.

13. The method, as set forth in claim 8, wherein updating tables and registers comprises updating advanced component and peripheral interconnect tables in accordance with features of the central processing unit.

14. A method of removing a central processing unit from a computer system, wherein the computer system comprises a first front side bus and a second front side bus each coupled to a north bridge of the computer, and wherein the central processing unit is coupled to the first or second front side bus, comprising:

triggering a removal event;

executing advanced component and peripheral interconnect methods;

deallocating processes on the first front side bus; and electrically isolating the first front side bus from the second front side bus, wherein the first front side bus comprises an entirely distinct path to the north bridge from the second front side bus.

15. The method, as set forth in claim 13, further comprising removing the central processing unit.

16. The method, as set forth in claim 14, further comprising:

updating system management basic input output system tables to indicate removal of the central processing unit; and operating the computer system without the central processing unit.

17. A method of mapping out a central processing unit from a computer system, comprising a first front side bus and a second front side bus each coupled to a north bridge of the computer, while the computer system is operation, wherein the central processing unit is coupled to the first front side bus, comprising:

receiving an error condition associated with the central processing unit;

resetting the computer system;

disabling the first front side bus while the second front side bus remains operational, wherein the first front side bus comprises an entirely distinct path to the north bridge from the second front side bus; and initializing the system without the first front side bus.

18. The method, as set forth in claim 16, comprising booting an operating system.

19. The method, as set forth in claim 17, comprising operating the computer system without the central processing unit.

* * * * *